2,933,480

SULFUR VULCANIZABLE UNSATURATED ELASTOMERIC INTERPOLYMERS OF MONOOLEFINS AND DIOLEFINS

William F. Gresham, Wilmington, and Madison Hunt, Claymont, Del., assignors to E. I. du Pont de Nemours and Company, Wilmington, Del., a corporation of Delaware No Drawing. Application June 17, 1959
Serial No. 820,845

9 Claims. (Cl. 260—80.5)

This invention relates to the preparation of polymers, and more particularly to the production of interpolymers of olefins and non-conjugated diene hydrocarbons which are valuable as synthetic rubbers and which may be generally referred to as "elastomers." This application is a continuation-in-part of our co-pending application Serial No. 561,338, filed January 25, 1956, now abandoned.

A number of high polymers of aliphatic monoolefins have been prepared, the most important of which have been made available through the recently developed polymerization catalysts. Some of these polymers have physical properties similar to those of rubber but in general are not capable of being cured by conventional methods, that is, by the use of sulfur or similar vulcanizing agents.

It is an object of the present invention to prepare rubber-like interpolymers of at least one terminally unsaturated monoolefin with a diolefin in which the double bonds are separated by more than two carbon atoms and in which at least one of the double bonds is terminally located, which interpolymers are valuable as elastomers having rubber-like properties and are capable of being vulcanized to elastic, resilient materials by the types of vulcanizing agents normally employed in the vulcanization of rubber. A further object of the invention is to provide a new and valuable synthetic elastomer which can be readily made by polymerization at relatively low temperatures and at low pressures and which will have vulcanizing properties similar to those of rubber.

The present invention therefore relates to the preparation of rubber-like interpolymers of at least one terminally unsaturated monoolefin with a diolefin in which the double bonds are separated by more than 2 carbon atoms and in which at least one of the double bonds is terminally located. These interpolymers contain ethylenic unsaturation corresponding to an iodine number of at least 3 and preferably not more than 50, and have intrinsic viscosities in benzene at 25° C. of between 0.5 and 5.0. Molecular weights of the polymers can therefore be roughly estimated from these intrinsic viscosities. Thus, the above lower limit of 0.5 corresponds to a molecular weight of about 15,000 and the upper limit of 5.0 corresponds to more than a million, using what is believed to be the most satisfactory empirical formula for compounds of this type, in which formula the intrinsic viscosity is proportional to the square root of the molecular weight. The intrinsic viscosity depends upon the solvent used. When determined in tetrachloroethylene, it is roughly twice that in benzene. These interpolymers are rubber-like materials, being vulcanizable to elastic resilient materials using the type of vulcanizing agents normally employed in the vulcanization of rubber, such as sulfur or sulfur-liberating compounds with or without sulfur-vulcanization accelerator.

The interpolymers of the present invention may be prepared by the use of catalysts generally known as coordination catalysts. These are made from components of two types, first, compounds of the transition heavy metals of groups IV, V and VI beginning with titanium, vanadium and chromium, and, second, organometallic compounds, hydrides and free metals of groups I, II and III. The compounds of the first type are preferably halides, oxyhalides and alcoholates, the preferred metals being titanium and vanadium. The metals of the component of the second type are preferably lithium, sodium, magnesium and aluminum and the organic portions are preferably alkyl radicals. In these organometallic compounds the valences of the metal may be partly satisfied by halogen or alkoxyl, provided, of course, that at least one bond connects the metal with an organic radical. Mixtures of two or more compounds of the type described above may often be used to advantage. These catalysts are not the subject of the present invention.

As is well known, these catalysts must be used in strict absence of oxygen, water or other material with which they react, and for this reason the solvents in which they are used are greatly limited, the preferred one being the saturated aliphatic and hydroaromatic hydrocarbons and certain non-reactive halogen compounds such as tetrachloroethylene and chlorobenzenes. These solvents conveniently serve as solvents for the polymerization of the olefins, which, for example, is usually carried out in a dilute suspension of the catalyst. The polymerization normally will be carried out at ordinary temperatures and pressures, although it is usually convenient to allow the temperature to rise spontaneously to from 50° to 60° C. due to the heat of the reaction. The rate of the reaction may be increased by the use of increased pressures, for instance, up to 1000 atmospheres or above, or by increased temperatures up to 150° C., although it is to be understood that elevated temperatures and pressures are not required. Where found desirable, the polymerization may be carried out at lower temperatures and pressures.

The monoolefin, which must be terminally unsaturated, preferably has a straight chain of 2 to 18 carbon atoms and thus may be ethylene, propylene, butene-1, pentene-1, hexene-1 and up to octadecene-1. The diolefin may contain 5 to 22 carbon atoms in either a straight or branched chain. Examples of suitable diolefins in which both double bonds are terminal are 1,4-pentadiene, 1,5-hexadiene (biallyl) 2-methyl-1,5-hexadiene, 3,3-dimethyl-1,5-hexadiene, 1,7-octadiene, 1,9-decadiene, 1,19-eisocadiene, and the like. A preferred form of the present invention, however, involves diolefins in which only one double bond is terminal. The latter are preferred because both double bonds of diolefins in which all the unsaturation is terminal tend to be used up in the copolymerization with the monoolefins, thus reducing the residual unsaturation which is required for good curing properties. Hence, large initial proportions of diolefins are often desirable. On the other hand, it has been found that when one double bond of the diolefin is internal and is preferably also shielded by alkyl groups, it does not react in the copolymerization but remains intact in the product, and that these internal double bonds still make the product readily vulcanizable with sulfur. Examples of diolefins with only one internal double bond are 1,4-hexadiene, 1,9-octadecadiene and the like. Of particular interest are 6-methyl-1,5-heptadiene, 7-methyl-1,6-octadiene, 11-ethyl-1,11-tridecadiene, and similar compounds in which the internal double bond is shielded. The interpolymers of the present invention contain from about 1 to about 40 mol percent of the diolefin, and preferably from 1 to 15 mol percent. Larger proportions of the diolefin are usually used in the polymerization when both double bonds of the diolefin are terminal, as explained above. This proportion of diolefin in the total monomers subjected to polymerization will give a product with an iodine number between 3 and 50. By using a large proportion of catalyst as in Example 3, it is possible to secure practically complete polymerization of the mono- and diolefins, particularly when the former are the more reactive ethylene and propylene, which polymers, however, still contain unsaturation equivalent to an iodine number of at least 3. It is often more economical, however, to use a small proportion of catalyst and to recover the unreacted monomers.

Ordinarily, softer products are obtained from the olefins and diolefins with longer carbon chains. It is often advantageous to use two monoolefins or two diolefins in place of one, particularly where they occur in mixtures normally. A mixture of ethylene and propylene is approximately equimolecular proportions is particularly useful in giving products with rubber-like properties of the kind desired. Since, however, the interpolymers containing too large a proportion of ethylene are deficient in plasticity, the proportion of the ethylene therein should not be more than 75% by weight.

The monomers may be added gradually to the catalyst solution, or they may all be added entirely at the start of the reaction, or one or more may be added at the start and the other (or others) may be added gradually. More catalyst may be added during the reaction, if found to be desirable. All of the processes, including making the catalyst and isolating and purifying the product, may be carried out continuously.

The interpolymers of the present invention may be milled and compounded satisfactorily in the same manner as the milling and compounding of rubber and the known synthetic elastomers, and may be cured with sulfur or sulfur-type vulcanizing agents in the same manner as rubber. As with rubber, the tensile properties are improved by incorporating carbon black.

The following examples are given to illustrate the invention. Parts are by weight, unless otherwise specified.

*Example 1*

A mixture of equal volumes of ethylene and propylene, that is, 28 parts by weight of ethylene to 42 parts of propylene, was passed slowly through 14 parts by weight of 1,5-hexadiene at from 20° to 30° C. The resulting mixture of gas and vapor, containing about one mol of the hexadiene to 4 mols of ethylene and 4 mols of propylene, was passed into a catalyst solution under agitation made as follows: Lithium aluminum hydride, 0.38 gram (0.01 mol), 6.5 grams (0.045 mol) of decene-1 and 4 grams of xylene were heated at from 140° to 160° C. for 3 hours in strict absence of water and oxygen. The reaction product of decene and lithium aluminum hydride was then cooled and taken up in 0.5 liter of thiophene-free benzene and reacted with 1.3 grams (0.007 mol) of titanium tetrachloride. A fine black suspension of the catalyst resulted. The introduction of the mixture of ethylene, propylene and hexadiene was continued for two hours, during which time the hexadiene was completely vaporized into the mixture of ethylene and propylene. The temperature rose spontaneously from 35° C. to 48° C. The polymer (37 grams) was isolated by pouring the solution into methanol containing hydrogen chloride and drying the resulting precipitate by milling on a rubber mill. It formed a readily milled elastomer, with an intrinsic viscosity of 1.00 (in benzene at 25° C.), indicating a molecular weight of about 50,000. The infrared spectrum showed absorption at 6.20 and 11.05 microns, indicating the presence of both chain and terminal unsaturation. The iodine number was 38, corresponding to 12.2% of the diene by weight, assuming that one double bond of each diene molecule is present in the polymer.

One hundred (100) parts of this elastomer were compounded with 60 parts of semi-reinforcing carbon black, 3 of zinc oxide, 2 of sulfur, 2 of paraffin, ⅔ part of tetramethyl thiuram disulfide and ⅓ part of mercaptobenzothiazole, and cured for 60 minutes at 153° C. The cured elastomer had a tensile strength of 1410 pounds per square inch, a modulus at 200% elongation of 240 and an elongation at break of 1000%.

*Example 2*

A similar elastomer was made by the process of Example 1 from 38 grams of ethylene, 147 grams of propylene and 20 grams of 1,5-hexadiene. When compounded and cured in the same way, it had a tensile strength of 1150 pounds per square inch, a modulus at 200% elongation of 380, and an elongation at break of 750%.

*Example 3*

A catalyst solution was made by the procedure described in Example 1, from 0.1 mol (3.8 grams) of lithium aluminum hydride, 0.5 mol (70 grams) of decene-1 and 0.05 mol (9.5 grams) of titanium tetrachloride and suspended in 1.75 liters of cyclohexane. There was added to this 3.5 grams of 6-methyl-1,5-heptadiene and the introduction of an equimolecular mixture of ethylene and propylene was then started, with agitation, at a rate such that all was absorbed in the reaction mass. After about one hour, the continuous addition of an additional 14 grams of the 6-methyl-1,5-heptadiene was started, the introduction of the mixed gases being continued. After 5.5 hours, the reaction mass was worked up as in Example 1. The resulting rubbery product amounted to 240 grams. Assuming complete reaction of the ingredients, this product contains approximately 2.5 mol percent of the 6-methyl-1,5-heptadiene. The intrinsic viscosity of this polymer measured in benzene was 0.83 and the iodine number was 15.7, corresponding to 6.8% of the diene by weight in the polymer, or 2.3 mol percent.

One hundred (100) parts of this elastomer was compounded with 30 parts of carbon black, 5 parts of zinc oxide, 3 parts of stearic acid, 2 parts of sulfur, 0.5 part of benzothiazyl disulfide, and 1 part of tetramethyl thiuram disulfide, and cured for 60 minutes at 150° C. The resulting elastomer had a tensile strength of 1700 pounds per square inch, a modulus at 300% elongation of 1050 pounds, and an elongation at break of 500%. The same stock had a resilience (Yerzley) of 57% and a compression set of 23%. Its tensile strength, determined at 70°, was 800 pounds. Test pieces held under tension in air at 100° C. and in air containing 0.5 part per million of ozone at room temperature did not break in 3 weeks, thus being comparable with the commercial oxidation-resistant isobutylene butadiene copolymer, GR–I, and much better than natural rubber which broke within 1 and 3 days in these tests. In a laboratory abrasion test believed to be reliable, the cured stock showed twice the resistance of a tread stock based on the commercial butadiene-styrene copolymer, GR–S.

*Example 4*

By the method of Example 3, 10 grams (0.091 mol) of 6-methyl-1,5-heptadiene and 30 grams (0.36 mol) of hexene-1 were polymerized in 200 ml. of cyclohexane containing the catalyst from 0.01 mol of titanium tetrachloride at 40° C. After stirring for 24 hours, precipitation with methanol gave 9.7 grams of a tacky, transparent elastomer, the intrinsic viscosity of which was 1.36, corresponding to a molecular weight of about 90,000, and the iodine number was 43. When compounded and heated as in Example 3, it gave a cured product with a tensile strength of 600 pounds per square inch and an elongation of 100%. It thus appeared to be over-cured.

Similarly, rubber-like, vulcanizable copolymers have been made, for example, from ethylene, propylene, and 2-methyl-1,5-hexadiene, from hexene-1 and 1,5-hexadiene, from hexene-1 and octadecadiene, and from hexene-1 and 3,3-dimethyl-1,5-hexadiene.

*Example 5*

Into a flask equipped with a stirrer, a thermometer, a gas delivery tube and a rubber syringe cap, was placed one liter of tetrachloroethylene. Ethylene was introduced at a rate of 200 ml. per minute and propylene at a rate of 800 ml. per minute. After saturation of the solution, there was added 0.173 gram (0.001 mol) of vanadyl trichloride, 0.34 gram (0.0017 mol) of aluminum triisobutyl and 0.44 gram (0.0033 mol) of aluminum chloride. Absorption of gases started immediately. 10.4 grams (0.05 mol) of 11-ethyl-1,11-tridecadiene was added to the solution and the reaction was continued at about 25° C. After 20 minutes, the ethylene feed was increased to 400 ml. per minute and 25 minutes after the reaction was initiated 0.06 gram (0.0003 mol) of aluminum triisobutyl and 0.093 gram (0.0007 mol) of aluminum chloride was added. The feed rate was changed to 500 ml. per minute of ethylene and 500 ml. per minute of propylene after 35 minutes, and maintained at that rate for 60 minutes, at which time the product was isolated by precipitation with a mixture of 2 liters of n-butyl alcohol and 1 liter of acetone. There was obtained 17.8 grams of elastomeric material. The propylene content, determined as described below, was 35% by weight; the intrinsic viscosity, determined on tetrachloroethylene at 30° C., was 7.25, corresponding to about 4 in benzene, and the iodine number was 14.3, corresponding to 11.8% of the 11-ethyl tridecadiene by weight. The product was cured according to the following recipe, which is given in parts by weight:

| | Parts |
|---|---|
| Polymer | 100 |
| Zinc oxide | 5.0 |
| Stearic acid | 1.0 |
| Tetramethylthiuram disulfide | 0.75 |
| Tellurium diethyldithiocarbamate | 1.50 |
| Sulfur | 0.4 |

The cured elastomer had the following properties: tensile strength at break 490 p.s.i.; elongation at break, 815%; Yerzley resilience at 25° C., 83%; Shore A hardness, 55; and compression set (22 hours at 70° C.), 18%.

*Example 6*

Propylene at the rate of 3 liters per minute and ethylene at 1 liter per minute were passed into 2 liters of tetrachloroethylene to which had been added 2.6 grams (0.0125 mol) of 3-ethyl-2,12-tridecadiene. After five minutes, 1.04 grams (0.006 mol) of vanadyl trichloride, 2.0 grams (0.010 mol) of triisobutylaluminum and 2.7 grams (0.020 mol) of aluminum chloride were added. A solution of 7.8 grams (0.0375 mol) of 11-ethyl-1,11-tridecadiene in 45 ml. of tetrachloroethylene was added to the reaction over a period of 45 minutes. The polymerization was continued for 5 minutes more with the gases introduced at the stated rates, and the product was then isolated by precipitation with methanol and acetone as before. There was obtained 46 grams of an elastomeric material. The propylene content, determined as described hereinafter, was 51 weight percent, the intrinsic viscosity (tetrachloroethylene at 30° C.) was 3.79, and the iodine number was 7.2, corresponding to a diene content of 6% by weight.

The polymer (100 parts) was compounded with 40 parts of SAF black (superabrasion furnace carbon black), 5 parts of zinc oxide, 1.0 part of stearic acid, 0.75 part of tetramethylthiuram disulfide, 1.50 parts of tellurium diethyldithiocarbamate and 0.5 part of sulfur, and cured for 60 minutes at 150° C. The cured material possessed the following properties: tensile strength at break, 3750 p.s.i.; elongation at break 630%; Shore A hardness 60; Yerzley resilience at 25° C., 55%, compression set (22 hours at 70° C.), 14.

*Example 7*

The terpolymerization reactor consisted of two 1-liter cylindrical flasks connected in cascade by an S-shaped tube leading from the bottom of the first flask into the top of the second flask. Each flask was equipped with a glass paddle stirrer sealed by means of a lubricated glass bearing, nitrogen inlet and outlet to a gas bubbler. In addition, the first flask was equipped with a thermometer and three inlet tubes for separate continuous introduction of catalyst suspension, diolefin solution and ethylene, propylene gas mixture. An S-shaped tube was attached to the bottom of the second flask to provide for continuous overflow of polymer solution from the reactor. The entire assembly was flamed and filled with nitrogen before beginning the terpolymerization. The catalyst was prepared continuously by feeding cyclohexane solutions of titanium tetrachloride (0.05 mol) at 4.5 ml. per minute and lithium aluminum tetradecyl (0.1 mol) at 6 ml. per minute into a stirred 150 ml. cylindrical premixing vessel, and allowing the brownish-black catalyst suspension to overflow from this premixer directly into the first polymerization flask. A holdup time of approximately 15 minutes was then allowed for the catalyst premixing process. Simultaneously, a 0.2 molar solution of 6-methyl-1,5-heptadiene in cyclohexane was fed at 10 ml. per minute, and an ethylene, propylene gas mixture containing 67 mol percent propylene was introduced into the first polymerization flask. The gas flow rate was continuously adjusted to maintain a slight positive pressure within the reactor.

The reactor was operated for a total of 9 hours at a temperature of 36° to 43° C. At peak operation, 28 grams of polymer per hour was obtained with an average residence time of 1.7 hours. The terpolymer product collected during the fourth to seventh hours of operation was combined and amounted to 66 grams after isolation. The isolation procedure consisted of precipitation with 2 to 3 volumes of isopropyl alcohol per volume of polymer solution, slurrying the precipitate in a Waring Blendor with acetone, and drying the washed solid on a rubber mill at 50° C. The combined polymer was extracted with 1500 ml. of benzene at room temperature for 48 hours. The terpolymer contained in the benzene extract was isolated as described above, and amounted to 44 grams (66% of the whole) of soft, snappy elastomer. This benzene-soluble fraction was found to contain 57 weight percent of propylene, and to have an iodine number of 30.3, corresponding to 13.3 weight percent of the diene, and intrinsic viscosity in benzene at 25° C. of 0.99.

The above benzene-soluble terpolymer was compounded and cured as follows:

| Compounding Recipe | Parts | |
|---|---|---|
| | A | B |
| Terpolymer | 100.0 | 100.0 |
| N-phenyl-beta-naphthylamine | 0.5 | 0.5 |
| HAF Black (high abrasion furnace carbon black) | | 30.0 |
| Zinc oxide | 5.0 | 5.0 |
| Stearic acid | 3.0 | 3.0 |
| 2-Benzothiazolyl disulfide | 0.5 | 0.5 |
| Tetramethylthiuram disulfide | 1.0 | 1.0 |
| Sulfur | 2.0 | 2.0 |
| Cure: 60 minutes at 150° C. | | |

The vulcanizates obtained were found to have the following properties:

| Stress-Strain | A | B |
|---|---|---|
| At 25° C.: | | |
| $M_{100}$, p.s.i. | 90 | 540 |
| $T_B$, p.s.i. | 130 | 1,420 |
| $E_B$, percent | 160 | 200 |
| At 70° C.: | | |
| $M_{100}$, p.s.i. | | 520 |
| $T_B$, p.s.i. | | 870 |
| $E_B$, percent | | 140 |
| Yerzley resilience, percent: | | |
| 25° C. | 83 | 72 |
| 100° C. | 87 | 78 |
| Shore A hardness, 25° C. | 50 | 68 |
| Compression Set B, 22 hours at 70° C. | 8 | 8 |

*Example 8*

The terpolymerization reactor consisted of a 5 liter 4-necked glass flask equipped as in Example 5. To the preflamed nitrogen-filled flask was added 1500 ml. of tetrachloroethylene. The solvent was then saturated at room temperature with a monomer feed consisting of an ethylene, propylene gas mixture, containing 67 mol percent of propylene, passed at a rate of 750 ml. per minute through a reservoir of 6-methyl-1,5-heptadiene maintained at 56±1° C. (to give a diolefin concentration of approximately 5 mol percent in the total gas feed). The catalyst was prepared by rapidly adding under nitrogen with stirring a solution of 4.75 grams (0.025 mol) of titanium tetrachloride in 100 ml. of tetrachloroethylene to a solution of 16.4 grams (0.083 mol) of aluminum triisobutyl in 400 ml. of tetrachloroethylene at 50° C. in a 1-liter 4-necked flask equipped with a sealed glass paddle stirrer, nitrogen inlet, thermometer, outlet to a gas bubbler and siphon tube closed off by a stopcock. The mixture was stirred for 1 minute at 48° to 50° C., and the resulting fine reddish-brown catalyst suspension was rapidly siphoned over by means of nitrogen pressure into the terpolymerization flask, while introduction of the monomer feed was continued. An additional 16.4 grams (0.083 mol) of aluminum triisobutyl was added to the mixture during the first 20 minutes of polymerization. During this period, the temperature of the mixture rose from 26° C. to 31° C. Gas absorption occurred and the viscosity of the mixture slowly increased. The terpolymerization was continued for an additional hour, maintaining the temperature at 20° C. by means of external cooling. The terpolymer was precipitated with 4 liters of n-butanol and worked up as in Example 7. There was obtained 48 grams of an elastomer found to contain 55 weight percent of propylene and to have an iodine number of 3.0, corresponding to 1.3 weight percent of diene.

The above terpolymer was compounded and cured as follows:

| Compounding recipe: | Parts |
|---|---|
| Terpolymer | 100.0 |
| N-phenyl-beta-naphthylamine | 1.0 |
| Zinc oxide | 5.0 |
| Stearic acid | 1.0 |
| Tetramethylthiuram disulfide | 1.0 |
| Tellurium diethyldithiocarbamate | 2.0 |
| Sulfur | 1.0 |

Cure: 40 minutes at 160° C.

The gum vulcanizate obtained was a resilient elastomer having the following properties:

Stress-strain at 25° C.:
| | |
|---|---|
| $M_{100}$, p.s.i. | 300 |
| $T_B$, p.s.i. | 480 |
| $E_B$, percent | 520 |
| Yerzley resilience, 25° C. percent | 52 |
| Shore A hardness, 25° C. | 55 |

*Example 9*

A polymerization reactor similar to that described in Example 8 was employed. The catalyst was prepared as follows:

A solution of 15.0 grams (0.075 mol) of aluminum triisobutyl and 42.0 grams of decene-1 in 150 ml. of tetrachloroethylene was heated to boiling under reflux and nitrogen for two hours to form aluminum tridecyl. Aluminum chloride, 4.8 grams (0.038 mol) was dissolved in the resulting solution under nitrogen at 100° to 110° C., and the mixture cooled to room temperature. One hundred milliliters (100 ml.) of this solution was added over a period of 3 minutes with rapid stirring and under nitrogen at room temperature to a solution of 0.87 gram (0.005 mol) of vanadyl trichloride (vanadium oxytrichloride) in 2 liters of tetrachloroethylene contained in the polymerization vessel. An ethylene-propylene feed containing 75 mol percent of propylene was introduced at a rate of 2 liters per minute into the rapidly stirred violet-pink catalyst solution. Simultaneously, 10 ml. of a solution of 16.4 grams (0.20 mol) of 1,4-hexadiene in 90 ml. of tetrachloroethylene was added. The remainder of the diene solution was added dropwise, continuously over the first hour of polymerization. The composition of the ethylene, propylene feed was changed to 50 mol percent of propylene after the first two minutes of polymerization and maintained at this composition for the remainder of the run, which was carried out for two hours. The temperature rose from 30° to 40° C. during the first 10 minutes of polymerization, and was maintained at 28° to 33° C. by external cooling for the remainder of the run. The terpolymer was isolated from the viscous solution by precipitation with 6 liters of n-butanol, and worked up as in Example 7. There was obtained 44 grams of snappy elastomeric terpolymer which was found to contain 30% by weight of propylene and to have an iodine number of 7.5, corresponding to 2.5% by weight of diene. The ethylene content was therefore 67.5%. The intrinsic viscosity (in tetrachloroethylene at 30° C.) was 2.38.

The above terpolymer was compounded and cured as follows:

| Compounding Recipe | Parts | |
|---|---|---|
| | A | B |
| Terpolymer | 100.0 | 100.0 |
| Zinc oxide | 5.0 | 5.0 |
| Stearic acid | 1.0 | 1.0 |
| HAF Black | | 40.0 |
| Tetramethylthiuram disulfide | 0.75 | 0.75 |
| Tellurium diethyldithiocarbamate | 1.5 | 1.5 |
| Sulfur | 0.4 | 0.4 |
| Cure: 40 minutes at 160° C. | | |

The vulcanizates obtained had the following properties:

| | | |
|---|---|---|
| Yerzley resilience, percent: | | |
| 25° C. | 81 | 66 |
| 100° C. | 85 | 73 |
| Bashore Rebound, percent, 25° C. | 71 | 60 |
| Compression Set B, percent, 70 hrs. at 100° | 59 | 35 |
| Shore A Hardness, 25° C. | 55 | 70 |

*Example 10*

A polymerization reactor similar to that described in Example 8 was employed. The catalyst was prepared as follows:

A solution of 30.0 grams (0.15 mol) of aluminum triisobutyl and 84.0 grams (0.6 mol) of decene-1 in 200 ml. of tetrachloroethylene was heated to boiling under reflux and nitrogen for 2 hours to form aluminum tridecyl. The solution was cooled to room temperature and transferred under nitrogen to 1800 ml. of tetrachloroethylene in the polymerization vessel. The solvent was presaturated with an ethylene, propylene gas mixture of 75 mol percent propylene composition. The introduction of the ethylene, propylene mixture was continued at a rate of 2250 ml. per minute, and a solution of 4.35 grams (0.025 mol) of vanadyl trichloride in 100 ml. of tetrachloroethylene was added with vigorous stirring at room temperature over a period of 2 minutes to complete the formation of the catalyst. During the addition, the temperature of the mixture rose from 29° C. to 41° C. and a rapid absorption of the gas feed commenced. The catalyst formed as a clear violet solution. When the addition of the vanadyl trichloride solution was complete, 30 ml. of a solution of 24.6 grams (0.3 mol) of 1,4-hexadiene in 70 ml. of tetrachloroethylene was added over a period of 9 minutes, during which time the temperature rose to 48° C. The introduction of ethylene and propylene was continued. The terpolymerization was carried out for an additional 2 hours, during which time the remainder of the diene solution was added dropwise continuously. The polymerization temperature was maintained at 38° to 40° C. by external cooling. The viscosity of the solution steadily increased during the course of the run. The terpolymer was isolated by precipitation with 6 liters of n-butanol, and worked up as in Example 7. There was obtained 97 grams of soft, rubbery terpolymer, which was found to contain 51% by weight of propylene and to have an iodine number of 8.9, corresponding to 2.9% by weight of the diene. The intrinsic viscosity (in tetrachloroethylene at 30° C.) was 1.60.

A gum vulcanizate of the above terpolymer was compounded and cured as follows:

Compounding recipe:
    Terpolymer _____parts__ 100.0
    Zinc oxide _____do____   5.0
    Stearic acid _____do____   1.0
    Tetramethylthiuram disulfide ___do____   1.5
    Tellurium diethyldithiocarbamate do____  3.0
    Sulfur _____do____   1.0
Cure: 40 minutes at 160° C.

Yerzley resilience:
    25° C. _____percent__ 69
    100° C. _____do____    84
Bashore rebound, 25° C. _____do____    47

Compression set B:
    22 hrs. at 70° C. _____do____     16
    70 hrs. at 100° C. _____do____     60
Shore A hardness, 25° C. _____       37–40

Black loaded vulcanizates of the terpolymer were compounded and cured as follows:

| Compounding Recipe [1] | Parts | |
|---|---|---|
| | A | B |
| Terpolymer | 100.0 | 100.0 |
| N-phenyl-beta-naphthylamine | 0.5 | 0.5 |
| N-methyl-N,4-dinitrosoaniline | 0.4 | 0.4 |
| Zinc oxide | 5.0 | 5.0 |
| Stearic acid | 1.0 | 1.0 |
| HAF Black | 45.0 | |
| SAF Black | | 45.0 |
| Tetramethylthiuram disulfide | 1.0 | 1.0 |
| Tellurium diethyldithiocarbamate | 2.0 | 2.0 |
| Sulfur | 1.0 | 1.0 |
| Cure: 60 minutes at 160° C. | | |

[1] Stocks were heated to 155°–160° C. for 1 hour in an air oven and blended for 5 minutes on a cold rubber mill before addition of accelerators and sulfur.

| Stress-Strain: | | |
|---|---|---|
| At 25° C.— | | |
| $M_{300}$, p.s.i | 1,670 | 1,520 |
| $T_B$, p.s.i | 2,450 | 2,690 |
| $E_B$, percent | 400 | 430 |
| At 70° C.— | | |
| $M_{300}$, p.s.i | 1,260 | 1,160 |
| $T_B$, p.s.i | 1,490 | 1,660 |
| $E_B$, percent | 320 | 360 |
| Yerzley Resilience, percent— | | |
| 25° C | 56 | 50 |
| 100° C | 69 | 62 |
| Bashore Rebound, percent, 25° C. | 45 | 36 |
| Compression Set B, percent, 22 hrs. at 70° C. | 11 | 13 |
| Shore A Hardness, 25° C. | 55–60 | 60–61 |

*Example 11*

A polymerization apparatus similar to that described in Example 8 was employed. Lithium aluminum tetradecyl was prepared in the polymerization flask by heating a mixture of 3.8 grams (0.1 mol) of lithium aluminum hydride and 70 grams (0.5 mol) of decene-1 to 130°–150° C. for 1 hour under nitrogen with gentle stirring. The mixture was then allowed to cool under nitrogen to 90° C. and the semi-solid mass dispersed with stirring in 2 liters of tetrachloroethylene. The resulting mixture was then saturated at 15° to 20° C. with a gaseous monomer feed obtained by bubbling propylene through a reservoir of 6-methyl - 1,5-heptadiene maintained at 50°±2° C. While introduction of the monomer feed was continued, 9.5 grams (0.05 mol) of titanium tetrachloride was rapidly added at 15° C. to the vigorously stirred mixture. The copolymerization was conducted for a period of 3 hours, introducing the monomer feed at a rate slightly greater than the copolymerization demand rate. The temperature of the mixture was maintained at 30° to 40° C. during this period by means of external cooling. The viscosity of the solution increased rapidly during the copolymerization. At the end of the copolymerization, a total of 19.2 grams (0.18 mol) of the diene had been introduced with the monomer feed. The copolymer was precipitated with 3 liters of n-butanol, and worked up as in Example 7 except that the final milling was at 80° C. There was obtained 146 grams of product.

The above copolymer, 135 grams, was extracted with 2 liters of ether for 2 hours at room temperature. The copolymer in the ether extract was precipitated with 4 liters of methanol and dried at 50° C. on a rubber mill. There was obtained 60.5 grams (45% of the original polymer) of soft, snappy elastomer, which was found to contain 97 weight percent of propylene and to have an iodine number of 9.7 and intrinsic viscosity (in tetrachloroethylene at 30° C.) of 1.88.

The vulcanizate of the above ether soluble copolymer was compounded and cured as follows:

Compounding Recipe:
    Copolymer _____parts__ 100.0
    Zinc oxide _____do____   5.0
    Stearic acid _____do____   3.0
    HAF black _____do____   30.0
    2-benzothiazolyl disulfide ____do____   0.5
    Tetramethylthiuram disulfide __do____   1.0
    Sulfur _____do____   2.0
Cure: 60 minutes at 150° C.

Stress-strain at 25° C.:
    $M_{300}$, p.s.i. _____ 1270
    $T_B$, p.s.i. _____ 1670
    $E_B$, percent _____ 350
Yerzley resilience:
    25° C. _____percent__ 51
    100° C. _____do____   73
Compression set B, 22 hrs. at 70° C. ___do__ 24
Shore A hardness, 25° C. _____ 60

*Example 12*

A polymerization reactor similar to that described in Example 8 was used. Lithium aluminum tetraoctyl was prepared directly in the polymerization flask by heating a mixture of 2.37 grams (0.0625 mol) of lithium aluminum hydride and 35.0 grams (0.313 mol) of octene-1 to 120°–140° C. with gentle stirring and under nitrogen and reflux for 2 hours. The mixture was then cooled to 80° C. and the resulting semi-solid dispersed in 900 ml. of tetrachloroethylene, maintaining the nitrogen atmosphere. The white suspension was cooled to 15° C. and 25 ml. of a solution of 97.5 grams (1.19 mols) of hexene-1 and 6.9 grams (0.063 mol) of 6-methyl-1,5-heptadiene in tetrachloroethylene (250 ml. total volume) was added with stirring. While the agitation was continued, a solution of 4.75 grams (0.025 mol) of titanium tetrachloride in 100 ml. of tetrachloroethylene was rapidly added to the mixture to form the catalyst. The remainder of hexene-1, diene solution was added dropwise continuously over the first 50 minutes of polymerization, during which time the temperature rose from 15° C. to 29° C. The copolymerization was allowed to continue for an additional 2.3 hours. At the end of this time, the temperature had risen to 33° C. and the mixture had become quite viscous. The copolymer was precipitated from solution with 3 liters of n-butanol, and worked up as before. There was obtained 25 grams of soft, tacky elastomer, which was found to have an iodine number of 11.2, corresponding to a diene content of 4.9%.

The above copolymer was compounded and cured as follows:

| Compounding recipe: | Parts |
| --- | --- |
| Copolymer | 100.0 |
| Zinc oxide | 5.0 |
| Stearic acid | 3.0 |
| HAF black | 30.0 |
| 2-benzothiazolyl disulfide | 0.5 |
| Tetramethylthiuram disulfide | 1.0 |
| N-phenyl-beta-naphthylamine | 0.5 |
| Sulfur | 1.0 |

Cure: 60 minutes at 150° C.

The vulcanizate obtained had the following properties:

Stress-strain at 25° C.:
| | |
| --- | --- |
| $M_{200}$, p.s.i. | 420 |
| $T_B$, p.s.i. | 600 |
| $E_B$, percent | 270 |

Yerzley resilience:
| | | |
| --- | --- | --- |
| 25° C. | percent | 59 |
| 100° C. | do | 83 |
| Compression Set B, 22 hrs. at 70° C. | do | 8 |
| Shore A hardness, 25° C. | | 43 |

The propylene content of the copolymers of Examples 5 through 11 was determined by measuring the optical density of a film 3 to 5 mils thick for the bands at 2.3 and 8.65 microns of the infrared spectrum. Since the optical density at 8.65 depends on the propylene content and that at 2.3 is proportional to the film thickness, their ratio is a measure of the propylene content of the sample. This ratio was measured for a series of ethylene-propylene copolymers for which the composition was reliably determined by using an ethylene tagged with $C^{14}$ in their manufacture and by determining the ethylene content by measuring the radioactivity of the copolymer and comparing it with the radioactivity of a sample of polyethylene prepared from the same $C^{14}$ tagged ethylene. The propylene content (by difference) of a number of samples was plotted against the ratio of optical densities to give a standardization curve, from which propylene contents of the copolymers of the examples were read.

While high molecular copolymers of conjugated dienes and terminally unsaturated monoolefins such as ethylene have been produced, it has been found that such copolymers are plastics rather than elastomers and are therefore not comparable with the interpolymers of the present invention. While under certain conditions these plastic products contain some unsaturation, they appear to be mixtures of homopolymers and are not similar to the elastomeric interpolymers disclosed herein.

The 11-ethyl-1,11-tridecadiene-1,11 used in the above examples was made by reacting ethyl undecylenate with ethyl Grignard reagent and dehydrating the resulting alcohol.

We claim:

1. Sufur-vulcanizable unsaturated rubber-like interpolymers of at least one terminally unsaturated straight chain monoolefin containing from 2 to 18 carbon atoms, and an alpihatic open chain diolefin containing from 5 to 22 carbon atoms in which the double bonds are separated by more than 2 carbon atoms and in which at least one double bond is terminally located, the diolefin comprising from about 1 to about 40 mol percent of the interpolymer, said interpolymers having an iodine number of from 3 to 50 and an intrinsic viscosity in benzene at 25° C. of from 0.5 to 5.0.

2. Sulfur-vulcanizable unsaturated rubber-like interpolymers of at least one terminally unsaturated straight chain monoolefin containing from 2 to 18 carbon atoms, and an alpihatic open chain diolefin containing up to 22 carbon atoms in which the double bonds are separated by more than 2 carbon atoms and in which only one double bond is terminally located, the diolefin comprising from about 1 to about 40 mol percent of the interpolymer, said interpolymers having an iodine number of from 3 to 50 and an intrinsic viscosity in benzene at 25° C. of from 0.5 to 5.0.

3. Sulfur-vulcanizable unsaturated rubber-like interpolymers of at least one terminally unsaturated straight chain monoolefin containing from 2 to 18 carbon atoms and from about 1 to about 40 mol percent of 6-methyl-1,5-heptadiene, said interpolymers having an iodine number of from 3 to 50 and an intrinsic viscosity in benzene at 25° C. of from 0.5 to 5.0.

4. Sulfur-vulcanizable unsaturated rubber-like interpolymers of at least one terminally unsaturated straight chain monoolefin containing from 2 to 18 carbon atoms and from about 1 to about 40 mol percent of 1,4-hexadiene, said interpolymers having an iodine number of from 3 to 50 and an intrinsic viscosity in benzene at 25° C. of from 0.5 to 5.0.

5. Sulfur-vulcanizable unsaturated rubber-like interpolymers of at least one terminally unsaturated straight chain monoolefin containing from 2 to 18 carbon atoms and from about 1 to about 40 mol percent of 11-ethyl-1,11-tridecadiene, said interpolymers having an iodine number of from 3 to 50 and an intrinsic viscosity in benzene at 25° C. of from 0.5 to 5.0.

6. Sulfur-vulcanizable unsaturated rubber-like interpolymers of ethylene, propylene and 6-methyl-1,5-heptadiene containing from about 1 to about 15 mol percent of the diene and not over 75 weight percent of the ethylene, said interpolymers having an iodine number of from 3 to 50 and an intrinsic viscosity in benzene at 25° C. of from 0.5 to 5.0.

7. Sulfur-vulcanizable unsaturated rubber-like interpolymers of ethylene, propylene and 1,4-hexadiene containing from about 1 to about 15 mol percent of the diene and not over 75 weight percent of the ethylene, said interpolymers having an iodine number of from 3 to 50 and an intrinsic viscosity in benzene at 25° C. of from 0.5 to 5.0.

8. Sulfur-vulcanizable unsatured rubber-like interpolymers of ethylene, propylene and 11-ethyl-1,11-tridecadiene containing from about 1 to about 15 mol percent of the diene and not over 75 weight percent of the ethylene, said interpolymers having an iodine number of from 3 to 50 and an intrinsic viscosity in benzene at 25° C. of from 0.5 to 5.0.

9. Sulfur-vulcanizable unsaturated rubber-like interpolymers of ethylene, propylene and 1,5-hexadiene containing from about 1 to about 15 mol percent of the diene and not over 75 weight percent of the ethylene, said interpolymers having an iodine number of from 3 to 50 and an intrinsic viscosity in benzene at 25° C. of from 0.5 to 5.0.

References Cited in the file of this patent

UNITED STATES PATENTS 2,039,364    Thomas et al. _____ May 5, 1936